United States Patent
Schroeder et al.

(10) Patent No.: US 6,811,169 B2
(45) Date of Patent: Nov. 2, 2004

(54) COMPOSITE SPRING DESIGN THAT ALSO PERFORMS THE LOWER CONTROL ARM FUNCTION FOR A CONVENTIONAL OR ACTIVE SUSPENSION SYSTEM

(75) Inventors: Del C Schroeder, Bloomfield Hills, MI (US); Lawrence J Oswald, Bloomfield Hills, MI (US); David G Speth, Sylvan Lake, MI (US); Craig A Patterson, Troy, MI (US); Suresh Nagesh, West Bloomfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 54 days.

(21) Appl. No.: 09/840,480

(22) Filed: Apr. 23, 2001

(65) Prior Publication Data

US 2002/0153689 A1 Oct. 24, 2002

(51) Int. Cl.$^7$ .............................. B60G 3/10; B60G 3/04; F16F 1/36
(52) U.S. Cl. ..................... 280/124.171; 280/124.134; 267/149; 267/41
(58) Field of Search .................... 280/124.171, 124.17, 280/124.134; 267/148, 149, 41, 230, 47, 246, 229, 158

(56) References Cited

U.S. PATENT DOCUMENTS

| | | | |
|---|---|---|---|
| 2,697,613 A | * 12/1954 | Giacosa | 267/230 |
| 3,968,958 A | 7/1976 | Huchette et al. | 267/47 |
| 4,540,197 A | * 9/1985 | Finn et al. | 280/124.171 |
| 4,557,500 A | * 12/1985 | Collard et al. | 280/124.171 |
| 4,611,793 A | 9/1986 | Nishiyama et al. | 267/52 |
| 4,659,071 A | 4/1987 | Woltron | 267/149 |
| 4,771,997 A | 9/1988 | Haldenwanger et al. | 267/260 |
| 4,772,044 A | 9/1988 | Booher | 280/694 |
| 4,969,633 A | 11/1990 | Ryan | 267/47 |
| 4,991,827 A | * 2/1991 | Taylor | 267/149 |
| 5,016,861 A | 5/1991 | Thompson et al. | 267/44 |
| 5,098,493 A | * 3/1992 | Taylor | 156/87 |
| 5,118,373 A | 6/1992 | Krummenacher | 156/175 |
| 5,251,930 A | * 10/1993 | Kusaka et al. | 280/124.171 |
| 5,425,829 A | 6/1995 | Chang | 156/175 |
| 6,000,706 A | 12/1999 | Boberg et al. | 280/690 |
| 6,029,987 A | * 2/2000 | Hoffman et al. | 280/124.171 |
| 6,361,032 B1 | * 3/2002 | Lawson | 267/47 |
| 6,457,729 B2 | * 10/2002 | Stenvall | 280/124.171 |

FOREIGN PATENT DOCUMENTS

| | | |
|---|---|---|
| EP | 384899 | 8/1990 |
| GB | 2021731 | 12/1979 |
| JP | 58-21034 | 2/1983 |
| JP | 58-77941 A | 5/1983 |
| JP | 58-118342 A | 7/1983 |

* cited by examiner

Primary Examiner—Paul N. Dickson
Assistant Examiner—Joselynn Y Sliteris
(74) Attorney, Agent, or Firm—Edwin W. Bacon, Jr.

(57) ABSTRACT

The present invention includes a flexible, resilient composite spring pivotally connected to the vehicle wheel assembly by standard means such as a ball joint and knuckle. The composite spring is formed having a sinusoidal profile with rectangular cross-section preferably spanning transversely between parallel vehicle wheel assemblies. The composite spring is pivotally connected to the parallel vehicle frames by opposing perpendicular brackets welded to an upper and lower portion of the vehicle frame. A rubber bushing is preferably provided within each bracket and is in contact with opposing sides of the composite spring, allowing the spring to pivot between the vehicle frame. The composite spring is preferably formed with carbon and glass fibers. The sinusoidal composite spring blank is preferably molded with a neutral axis extending along the length of the spring at a midpoint of the sinusoidal profile.

7 Claims, 5 Drawing Sheets

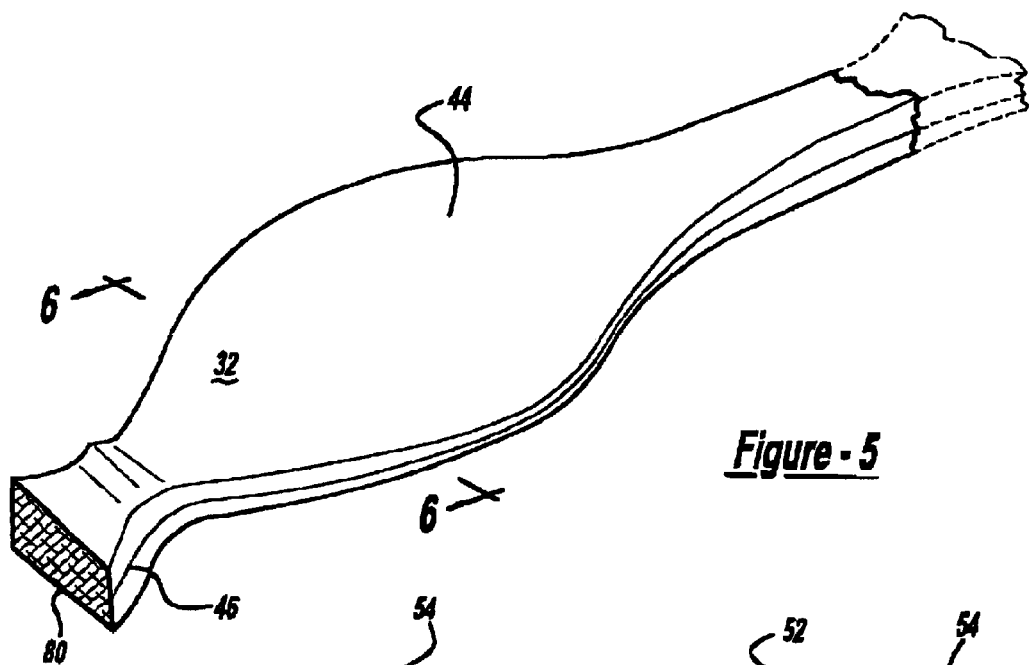
_Figure - 5_
_Figure - 6_
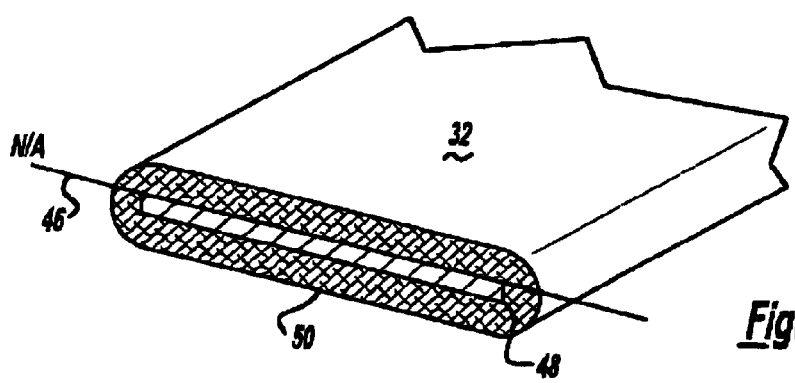
_Figure - 7_

COMPOSITE SPRING DESIGN THAT ALSO PERFORMS THE LOWER CONTROL ARM FUNCTION FOR A CONVENTIONAL OR ACTIVE SUSPENSION SYSTEM

FIELD OF THE INVENTION

The present invention relates generally to a vehicle suspension system. More specifically, the present invention relates to a composite spring and method of manufacturing such a spring that functions as a lower control arm while simultaneously serving as the coil spring, stabilizer bar and shock absorber in a suspension system.

BACKGROUND OF THE INVENTION

Springs, and more specifically, leaf and coil springs, are used to form a portion of a suspension system used to suspend a vehicle's running gear from the vehicle's frame and to provide stability to the vehicle as it is subjected to compression, tension, torsion and bending forces during operation.

It is well known in the art to form composite leaf springs for use as a spring and/or control arm in a vehicle suspension system. The composition of the leaf spring varies with the location of the suspension system. Generally, multi-leaf springs formed of a plurality of metal leaves and rubber disposed between the leaves are used for rear suspensions while coil springs, as stated above, are used for a vehicles' front suspension. More recently, composite leaf springs constructed of glass fiber in an epoxy matrix have been developed to replace steel leaf and coil springs in production passenger cars. Examples of these springs and a method for making the same may be found in U.S. Pat. No. 3,968,958 issued Jul. 13, 1976 to Huchette et al. and entitled "Composite Material Springs and Manufacture;" U.S. Pat. No. 4,611,793 issued Sep. 16, 1986 to Nishiyama et al. and entitled "Leaf Spring Assembly for Wheel Suspension;" U.S. Pat. No. 4,659,071 issued Apr. 21, 1987 to Woltron and entitled "Process for Producing a Plastic Leaf Spring, as well as a Plastic Leaf Spring Appropriately Manufactured According to this Process;" U.S. Pat. No. 4,771,997 issued Sep. 20, 1988 to Haldenwanger et al. and entitled "Motor Vehicle Fiber-Reinforced Synthetic Material Leaf Spring or Transverse Link with End Clamp/Power-Induction Unit;" U.S. Pat. No. 4,772,044 issued Sep. 20, 1988 to Booher and entitled "Vehicle Suspension System with Flexible Control Arm;" U.S. Pat. No. 4,969,633 issued Nov. 13, 1990 to Ryan and entitled "Molded Fiber Reinforced Plastic Leaf Spring;" U.S. Pat. No. 5,016,861 issued May 21, 1991 to Thompson et al. and entitled "Mounting of a Single Transverse Leaf Spring for Vehicles;" U.S. Pat. No. 5,118,373 issued Jun. 2, 1992 to Krummenacher and entitled "Method of Winding Fiber Material to Form a Leaf Spring;" U.S. Pat. No. 5,425,829 issued Jun. 20, 1995 to Chang and entitled "Method of Manufacturing Hybrid Composite Leaf Springs;" along with many foreign patents and publications.

None of the above-described patents disclose the use of a composite spring that includes dimensional integrity and flexibility as part of a suspension system for automotive vehicles. The apparatus and method of making the apparatus of the present invention includes both dimensional integrity and flexibility in a single element. The composite spring of the present invention replaces the control arm, spring and stabilizer bar in a conventional suspension system and additionally, the shock absorber in an active suspension system.

SUMMARY OF THE INVENTION

It is, therefore, the object of the present invention to provide an improved vehicle suspension system.

It is another object of the present invention to provide a composite spring for use in a vehicle suspension system where the composite spring replaces the lower control arm, the stabilizer bar and the coil spring in a standard vehicle suspension system.

It is another object of the present invention to provide a composite spring for use in a vehicle suspension system where the composite spring replaces the lower control arm, the stabilizer bar, the coil spring and the shock absorber in an active vehicle suspension system.

It is further an object of the present invention to provide a method for making a composite spring for use in a vehicle suspension system that is formed of both carbon and glass fibers and having a sinusoidal profile transversely mounted about the vehicle frame.

In a preferred embodiment of the present invention, a flexible, resilient composite spring is pivotally connected to the vehicle wheel assembly by standard means such as a ball joint and knuckle. The composite spring is formed having a sinusoidal profile with rectangular cross-section preferably spanning transversely between parallel vehicle wheel assemblies. The composite spring is pivotally connected to the parallel vehicle frames by opposing perpendicular brackets welded to an upper and lower portion of the vehicle frame. A rubber bushing is preferably provided within each bracket and is in contact with opposing sides of the composite spring, allowing the spring to pivot between the vehicle frame.

The composite spring of the present invention is preferably formed with carbon and glass fibers. The sinusoidal composite spring blank is preferably molded with a neutral axis extending along the length of the spring at a midpoint of the sinusoidal profile. The blank preferably is formed with carbon fibers extending at and below the neutral axis surrounded by glass fibers, both fibers preferably impregnated with a hardening substance. The carbon fibers are successfully located at and below the neutral axis of the blank by pre-loading the mold frame in tension before placing the frame in the mold. Location of the carbon fibers in this manner provides a stronger, more durable composite spring for both a standard and active suspension system.

BRIEF DESCRIPTION OF THE DRAWINGS

FIG. 5 is a perspective view of a preferred embodiment of the composite spring of the present invention.

FIG. 6 is a cross-sectional view of the preferred embodiment of the composite spring of the present invention taken along line 6—6 of FIG. 5.

FIG. 7 is an end view of the preferred cross-section of the composite spring of the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
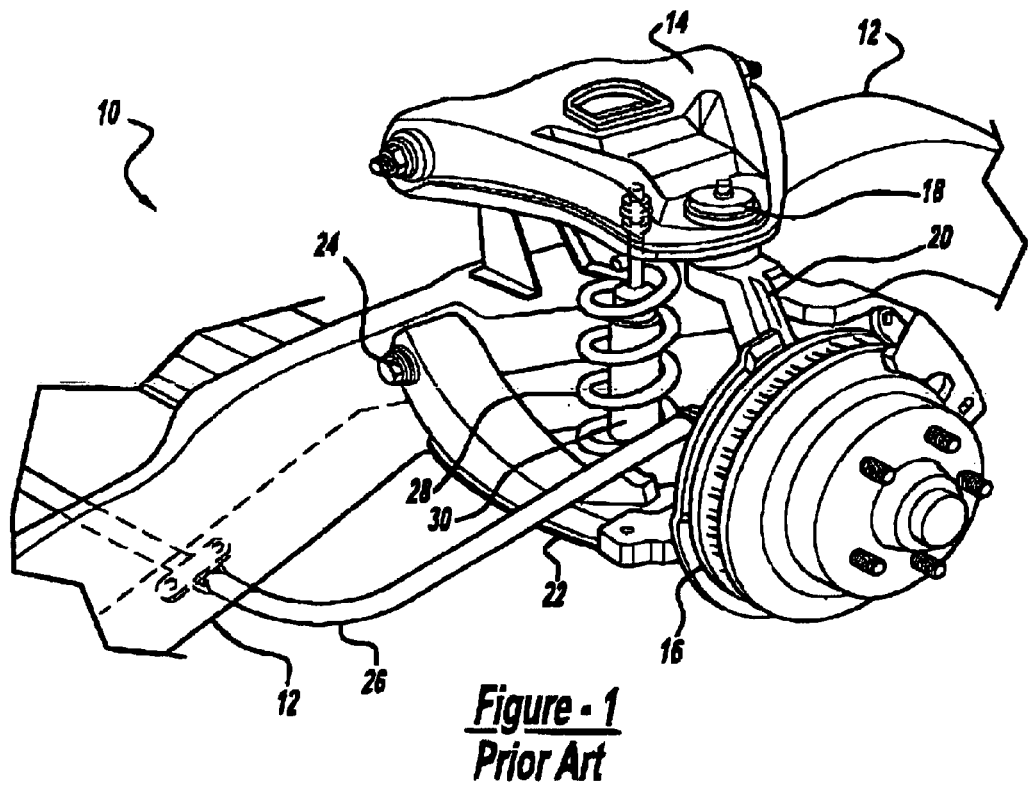
FIG. 1 is a perspective view of a front wheel suspension of the prior art.

With reference first to FIG. 1, the prior art vehicle front suspension system 10 is there shown and includes an automotive vehicle frame 12 with an upper control arm 14 pivotally secured to the vehicle frame 12 and to the wheel assembly 16 by a ball joint 18 and knuckle 20. A lower control arm 22 is secured to the vehicle frame 12 by a pivoting connection 24 that allows the lower control arm 22 and the wheel assembly 16 to move relative to the vehicle frame 12. The opposite end of the lower control arm 22 is similarly attached to the wheel assembly 16 by a ball joint and knuckle (not shown.) A stabilizer bar 26 is also shown extending from the wheel assembly 16 forward. Secured to the lower control arm 22 and extending upwardly toward the vehicle frame 12 is a coil spring 28. Disposed within the coil spring 28 is a shock absorber 30.

Figure 3:
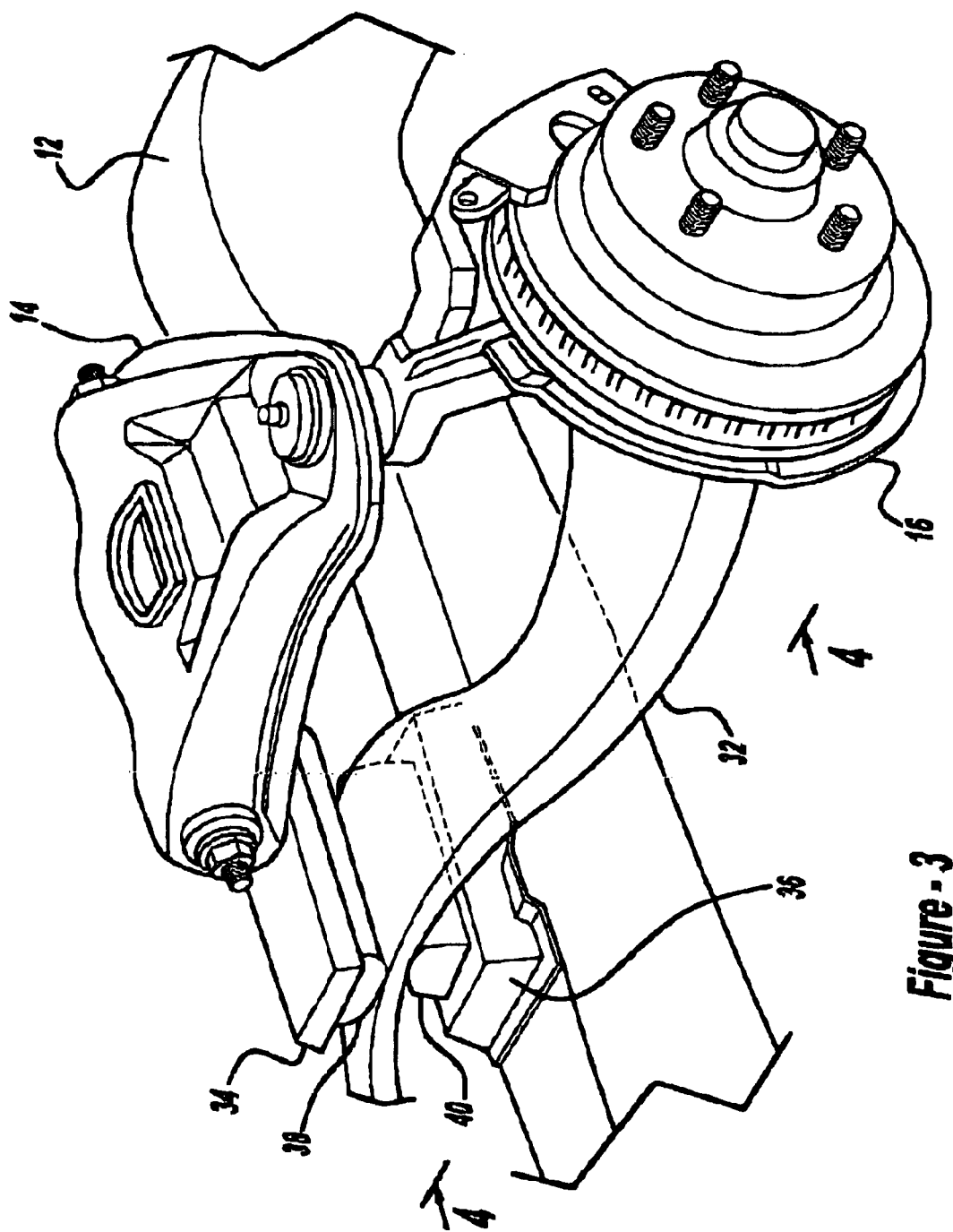
FIG. 3 is a perspective view of a front wheel suspension of the preferred embodiment of the present invention.

FIG. 3 is a perspective view of a portion of an active suspension system of an automotive vehicle illustrating the preferred embodiment of the present invention. Some of the elements in FIG. 1 correspond to the elements illustrated in FIG. 3. A vehicle frame 12 is shown with an upper control arm 14 pivotally secured to the vehicle frame 12 and the wheel assembly 16. A composite spring 32 of the present invention is shown pivotally secured to the vehicle frame 12 by upper and lower brackets 34, 36 preferably welded or bolted to vehicle frame 12. Rubber bushings 38, 40 are seated within or above the brackets 34, 36 and support the composite spring 32 within the vehicle frame 12. The composite spring 32 is preferably secured to the wheel assembly 16 by a standard ball joint and knuckle (not shown.)

Figure 4:
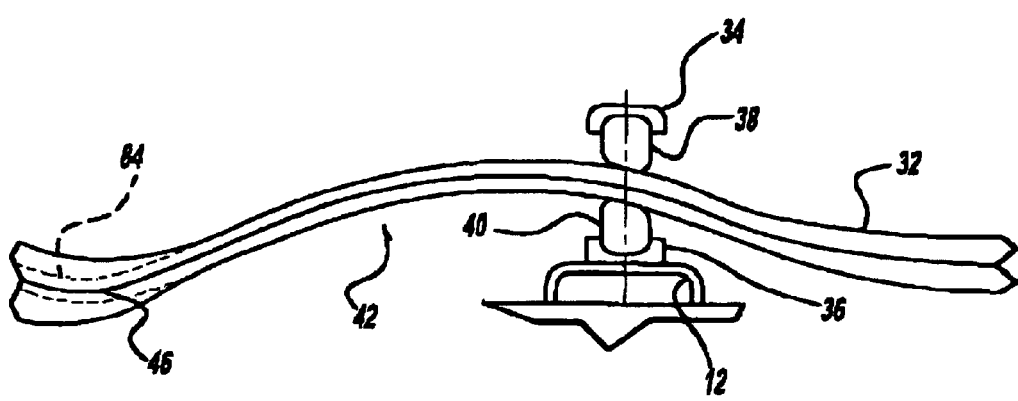
FIG. 4 is a cross-sectional view of the preferred embodiment of the composite spring of the present invention taken along line 4—4 of FIG. 3.

FIGS. 4 through 7 show the composite spring 32 of the present invention. With reference to FIG. 4, the composite spring 32 is there shown with upper and lower brackets 34,36. Lower bracket 36 is shown welded to vehicle frame 12. Rubber bushings 38, 40 are provided within the corresponding brackets 34,36 and support the composite spring 32 transversely along the width of a vehicle between parallel vehicle frames 12. The composite spring 32 is allowed to pivot within the opposing rubber bushings 38,40 and brackets 34,36.

The composite spring 32 preferably is formed in a sinusoidal pattern having a sinusoidal profile 42 extending transversely as shown in FIG. 4. FIG. 5 shows the composite spring 32 of the preferred embodiment having a parabolic-shaped width 44 extending transversely of the vehicle frame 12. FIGS. 4, 5 and 7 show a neutral axis 46 extending the length of the composite spring 32 at the midpoint of the sinusoidal profile 42. FIG. 7 shows the preferred formation of the composite spring 32 having carbon fibers 48 spanning the length of the composite spring 32 at and below the neutral axis 46. Glass fibers 50 preferably extend about the carbon fibers 48 surrounding the carbon fibers 48 and forming the preferred sinusoidal profile 42 and parabolic-shaped width 44 of the composite spring 32 of the present invention.

FIG. 6 shows the composite spring 32 preferably having a rectangular cross-section 52. This rectangular cross-section 52 is constant throughout the length of the composite spring 32. As such, the composite spring 32 is provided with an equal surface area A at all points along the length of the composite spring 32 as measured in a plane perpendicular to the neutral axis. The rectangular cross-section 52 preferably has rounded edges 54 formed with a ⁵⁄₁₆" radius 56 on all four sides, the full length of the composite spring 32.

Figure 2:
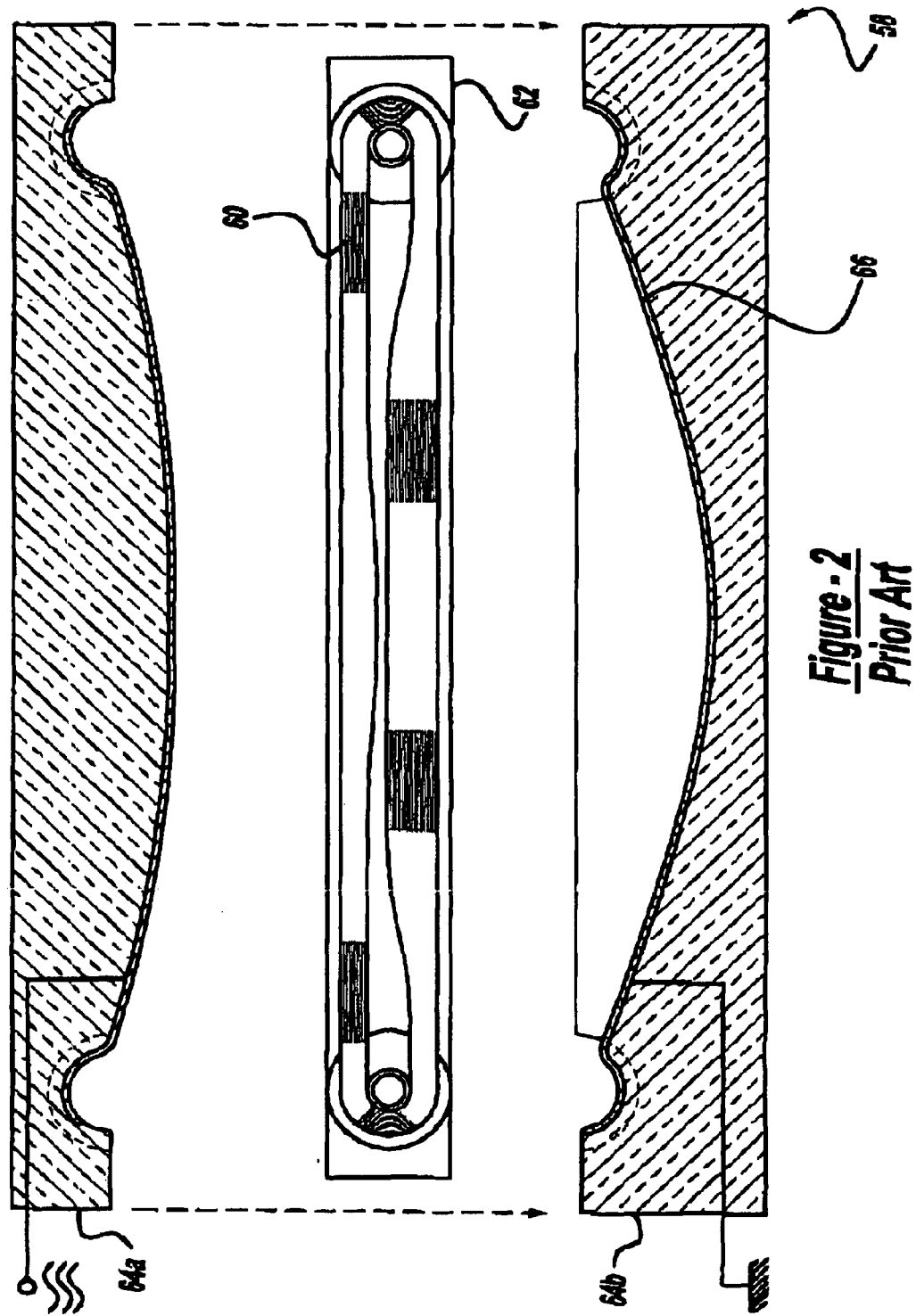
FIG. 2 is a cross-sectional view of a press mold of the prior art.

FIG. 2 shows the prior art method of forming a conventionally shaped composite spring blank 58 for use as a lower control arm 22 (FIG. 1.) Typically, fibers 60 are continuously wound around a frame 62 and placed within mold halves 64a and 64b. The fibers 60 may be impregnated before or during the curing process. The mold chamber 66 forms the shape of the composite spring blank 58.

Figure 8:
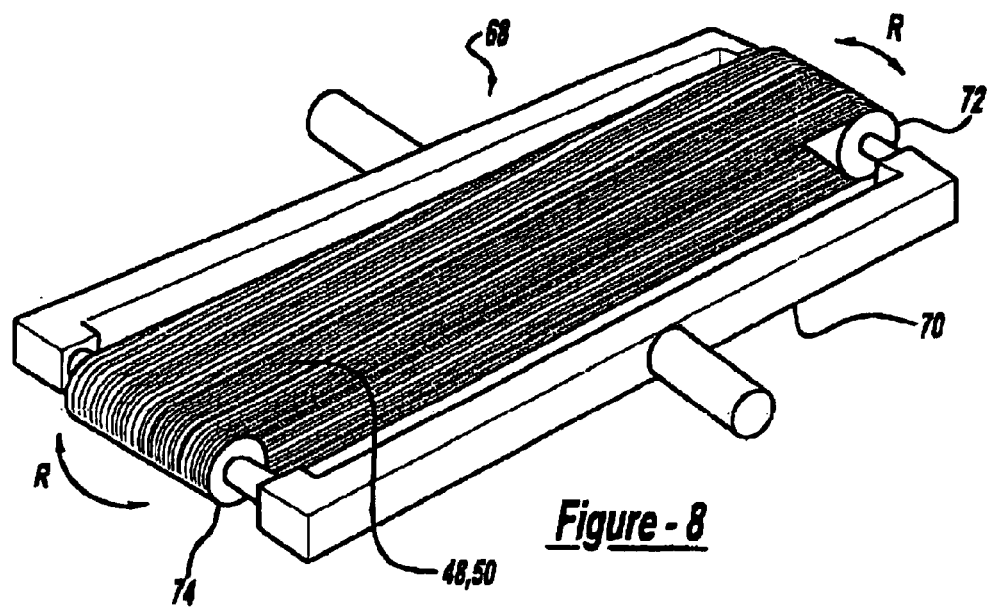
FIG. 8 is a perspective view of the preferred method for forming the composite spring of the present invention.
Figure 9:
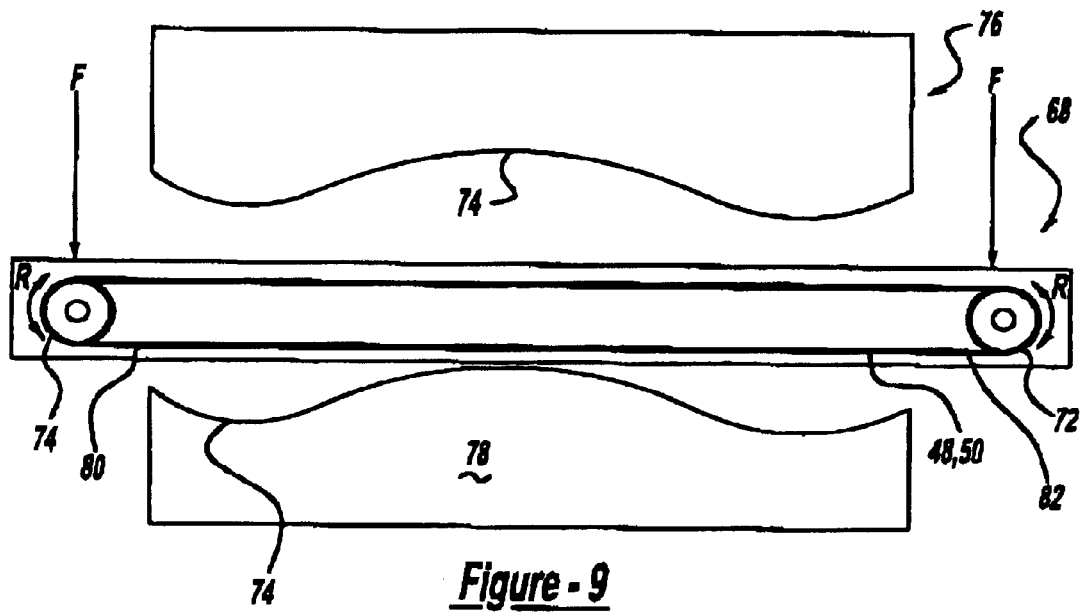
FIG. 9 is a front view of the preferred method for forming the composite spring of the present invention.

With reference to FIGS. 8 and 9, the preferred method for forming the composite spring blank 68 of the present invention is there shown. Initially, strands of carbon fiber 48 preferably impregnated with a hardening substance are wound into several layers onto a frame 70. Strands of glass fiber 50 preferably impregnated with a hardening substance are wound into several layers onto frame 70 about carbon fibers 48. This layering is best shown in FIG. 7 and is well known in the art. The frame 70 is provided with rotating collars 72,74 and indicated by R at each end for even tensioning of the carbon and glass fibers 48,50 during the winding process and determines the neutral axis of the resulting composite spring 32. Prior to forming the blank 68, the frame 70 with fibers 48,50 wound about collars 72,74, is preloaded by placing a downward force on collars 72,74 as shown at F. This downward force F is preferably equal on both sides and places the lower fibers 48,50 in tension prior to placing the frame 70 in mold chamber 74 of mold 76. By placing the fibers 48,50 in tension prior to forming the blank 68, the carbon fibers 48 are located at and below the neutral axis 46 of the blank 68 as is preferred by the invention. The pre-loaded blank 68 is placed within the sinusoidal shaped mold chamber 74 forming tension on the male mold half 78 and cured. Once the blank 68 is cured and formed, the ends 80,82 are preferably cut by a wet sanding method and may be tapered 84 as shown by dotted lines in FIG. 4 to eliminate material where stress is lowest along the composite spring 32 at the point of connection to the wheel assembly 16 on either end of the vehicle suspension system 10.

The transverse composite spring of the present invention is preferably formed of carbon and glass fibers where the carbon fibers are stronger and will have approximately one third the elongation during vehicle usage than the corresponding glass fibers. Thus, the glass fibers provide the necessary spring action while the carbon fibers provide the needed strength to the vehicle suspension system of the present invention. Further, the sinusoidal profile of the composite spring is shown to be the most effective use of the fiber material. The pre-loaded carbon fibers located at and below the neutral axis of the spring reinforce the neutral axis and enable a vehicle with an active suspension system to more easily hold the vehicle at rest at a given height. The composite spring is then driven up and down by the active suspension system during vehicle use.

The composite spring of the present invention may also be used with a conventional vehicle suspension system, however, the preferred embodiment would include the use of the present invention in conjunction with a shock absorber. In both the conventional and active suspension systems, the composite spring of the present invention functions as an integral part of the system by replacing the lower control arm, the stabilizer bar and the coil spring forming a much lighter and space efficient system.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A suspension system for a vehicle having parallel wheel assemblies, the suspension system comprising:

longitudinally extending vehicle frame members; and a composite spring with two ends, said composite spring having a sinusoidal neutral axis in a free state and being perpendicularly positioned across said vehicle frame member, wherein said two ends are connected to the parallel wheel assemblies.

2. The vehicle suspension system of claim 1, further comprising means for pivotally supporting said composite spring between said vehicle frame members.

3. The vehicle suspension system of claim 1, said composite spring having a sinusoidal neutral axis further comprising carbon fiber spanning the length of said spring at said neutral axis.

4. The vehicle suspension system of claim 3, said composite spring having a sinusoidal neutral axis further comprising carbon fiber spanning the length of said spring below said neutral axis.

5. The vehicle suspension system of claim 4, said composite spring having a sinusoidal neutral axis further comprising glass fiber spanning the length of said spring and surrounding said carbon fiber.

6. The vehicle suspension system of claim 5, said composite spring having a sinusoidal neutral axis further comprising a rectangular cross-section, said cross-section having an equal surface area at all points along the length of said leaf spring as measured in a plane perpendicular to said neutral axis.

7. The vehicle suspension system of claim 6, said rectangular cross-section of said composite spring having a sinusoidal neutral axis further having rounded edges, wherein each of said edges is formed of a 5/16" radius.

* * * * *